Oct. 21, 1924.
D. C. BREWER
CONVERTIBLE LIGHT FOR MOTOR CARS
Filed June 9, 1922
1,512,742
2 Sheets-Sheet 1
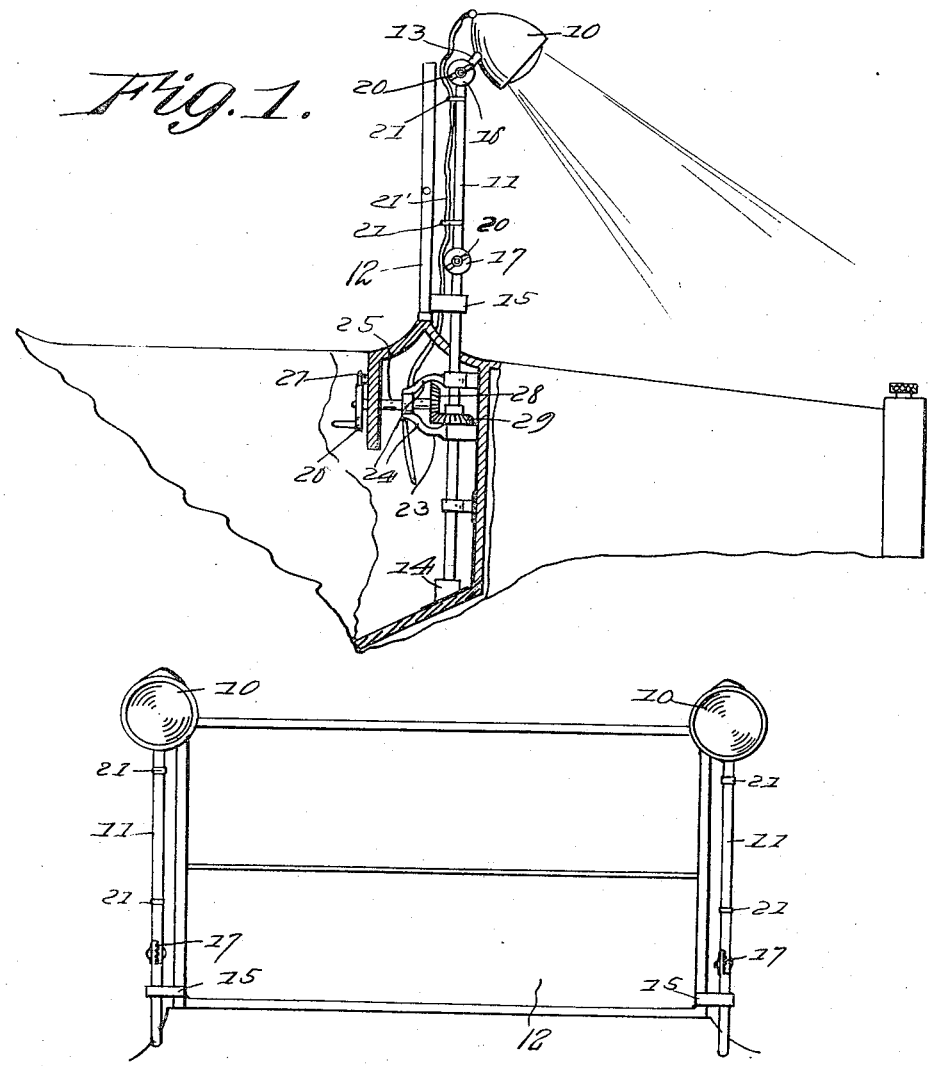
Inventor
Dotson C. Brewer,
By
Attorney Oct. 21, 1924.
D. C. BREWER
1,512,742
CONVERTIBLE LIGHT FOR MOTOR CARS
Filed June 9, 1922  2 Sheets-Sheet 2
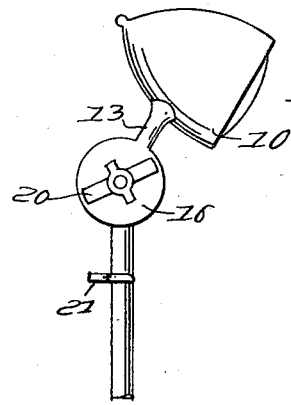
Fig. 3.
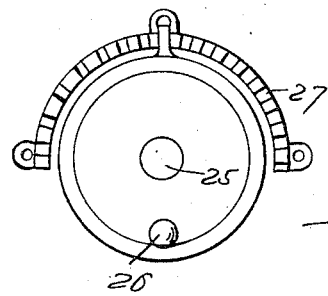
Fig. 4.
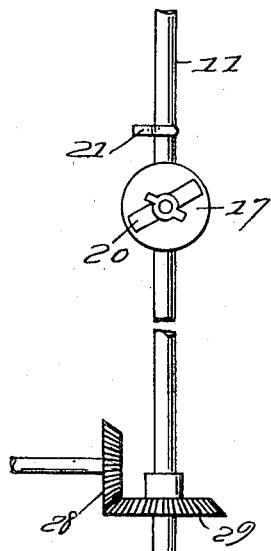
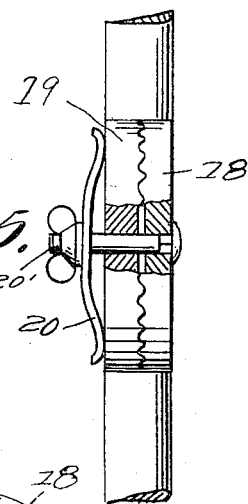
Fig. 5.
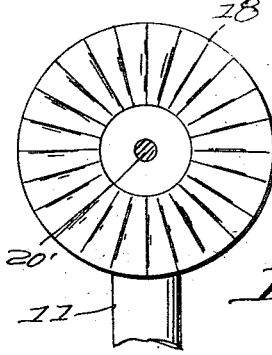
Fig. 6.
Inventor
Dotson C. Brewer,
By
Attorney Patented Oct. 21, 1924.

1,512,742

UNITED STATES PATENT OFFICE.

DOTSON C. BREWER, OF AUGUSTA, KANSAS.

CONVERTIBLE LIGHT FOR MOTOR CARS.

Application filed June 9, 1922. Serial No. 567,013.

*To all whom it may concern:*

Be it known that DOTSON C. BREWER, a citizen of the United States of America, residing at Augusta, in the county of Butler and State of Kansas, has invented new and useful Improvements in Convertible Lights for Motor Cars, of which the following is a specification.

The object of the invention is to provide a convertible headlight and trouble light for use in connection with motor driven vehicles which while adapted under normal conditions to perform the usual functions of a headlight in illuminating the path of the vehicle for the guidance of the driver is adapted to be utilized conveniently as a means of aiding the mechanic in making adjustments or repairs on the road where there is no other source of illumination: and furthermore to provide a headlight which is adapted to cast light upon that portion of the road directly in advance of the car which must be seen by the driver in order to properly direct the movements of the car without involving the casting of a glare in the eyes of the driver of a car approaching in the opposite direction on the same road, and in this connection to provide a dirigible light to assist the driver in following the turns or curves in the road and in casting a signal light in the direction indicating a deviation from the direct path; and with these objects in view the invention consists in a construction and combination of parts of which a preferred embodiment is shown in the accompanying drawings, wherein:

Figure 1 is a side view, partly in section, of a motor vehicle equipped with convertible lights constructed and mounted in accordance with the invention.

Figure 2 is a front elevational view of the structure of Figure 1.

Figure 3 is a detail side elevational view of one of the lamps and its supporting standard.

Figure 4 is a front elevational view of the operating means by which the operator is enabled to change the direction of projection of the rays of the headlight.

Figure 5 is a detail elevational view, partly in section, of one of the joints connecting the elements of the headlight standard.

Figure 6 is a detail elevational view of one of the complemental elements comprising the joints.

The headlights which are preferably of the electrical type as ordinarily employed in this connection include lamps 10 supported by standards 11 which are disposed at opposite sides of the car, slightly in advance of the plane of the wind shield indicated at 12 but with the lamps disposed in an elevated position preferably near the plane of the upper edge of the wind shield instead of on the front wheel guards or at the front of the hood and near the bottom of the latter as in the ordinary practice, to the end that by downwardly inclining the lamp as by disposing the stem 13 thereof in an upwardly and forwardly inclined position, the shaft of light is thrown forward and downward upon the path-way and in advance of the car and to a limited distance in front of the same so as to produce no glare at a height sufficient to interfere with a view of the driver of an approaching car. The standard is mounted at its lower end in a step bearing 14 preferably carried by a fixed part of the car structure and a bearing bracket 15 extending from the car frame near the bottom of the wind shield or from the frame of the wind shield, and at convenient points in the length thereof, as for example between the stem 13 and the upper end of the body portion of the standard and in the body portion of the standard above the bearing bracket 15, there are arranged joints 16 and 17 adapted to be yieldingly held in the normal condition wherein the lamp is held in an elevated position but adapted to be broken to permit of deflection of the upper portion of the standard to arrange the lamp in the position where it may be utilized as a trouble light to illuminate the interior of the hood and the mechanism contained therein for the benefit of the mechanician in making repairs or adjustments on the road when other sources of light are unavailable. The joints 16 and 17 which, for example, may be termed snap joints in that they are adapted to remain in the normal position until forcibly broken by the operator, may be variously constructed in the drawing, are shown as consisting of complemental disks 18 and 19 having interlocking ratchet faces held in their engaged relation by a spring 20 carried on a bolt 20' constituting the pivot of the joint. If the conductor wires 21' of the lighting unit are carried outside of the standard as indicated they should be held in proper relation therewith by suitable guide eyes 21.

Mounted in a suitable bracket 23 through bearings 24 of which the standard extends is a spindle 25 extending into the car beyond the plane of the wind shield and provided with an operating lever or handle 26 traversing a toothed segment 27, and the forward end of this spindle is provided with a pinion 28 meshing with a pinion 29 on the standard to the end that the operator by swinging the lever 26 in one direction or the other may turn the standard to direct the rays of the lamp either to the right or the left as an assistance in rounding curves or making detours, picking out roadside direction signs and the like. When the car as in the ordinary practice is equipped with a plurality of headlights as above suggested, one being near each side edge of the wind shield, a separate operating means is provided for each to permit of independent direction thereof in the operation of the car, so that one may be allowed to remain in the forwardly directed position while the other is turned at an angle.

A further advantage of a headlight constructed and mounted as herein indicated resides in the fact that in an emergency it may be turned to direct the rays of light rearwardly of the car and by reason of the joints in the standards the column of light may be directed at any desired angle in a vertical plane although in the normal operation of the device as herein-above indicated the light rays are directed forwardly and downwardly from the elevated position of the lamps.

Having described the invention, what is claimed as new and useful is:—

The combination with a vehicle, of a lamp carrying standard mounted in front of and parallel with the windshield and extending to a point adjacent the top of the windshield, a lamp provided with a stem having a snap joint connection with the upper end of the standard, a snap joint interposed in the standard at a point adjacent the lower edge of the windshield to permit of breaking the standard to lower the lamp, bearings for said standard below the second said snap joint, and means for rotating the standard in said bearings, irrespective of the adjustment of said snap joints.

In testimony whereof he affixes his signature.

DOTSON C. BREWER.